US006376087B1

(12) United States Patent
Ozeki et al.

(10) Patent No.: US 6,376,087 B1
(45) Date of Patent: Apr. 23, 2002

(54) DEVELOPING AGENT CARRIER, DEVELOPING UNIT, AND IMAGE FORMING APPARATUS

(75) Inventors: Yukihiro Ozeki, Yokohama; Katsuhiro Sakaizawa, Numazu, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/413,465

(22) Filed: Oct. 6, 1999

(30) Foreign Application Priority Data

Oct. 8, 1998 (JP) .......................................... 10-303400

(51) Int. Cl.[7] .......................... B32B 9/04; G03G 15/08; G03G 15/16

(52) U.S. Cl. .................... 428/447; 428/423.1; 399/279; 399/308

(58) Field of Search .......................... 399/19, 279, 308; 428/447, 423.1

(56) References Cited

U.S. PATENT DOCUMENTS 5,235,386 A * 8/1993 Yano et al. ................. 355/219
5,324,885 A * 6/1994 Koga et al. ................. 118/657
5,778,286 A * 7/1998 Kido et al. ................. 399/159
5,904,777 A * 5/1999 Nakatogawa et al. ....... 118/658

FOREIGN PATENT DOCUMENTS

JP 05-072883 3/1993

* cited by examiner

*Primary Examiner*—Philip Tucker
*Assistant Examiner*—Michael J Feely
(74) *Attorney, Agent, or Firm*—Fitzpatrick, Cella, Harper & Scinto

(57) ABSTRACT

It is proposed to provide a developing agent carrier, developing unit, and image forming apparatus which can stably obtain a high-quality image. There is provided a developing agent carrier comprising an elastic portion which comes into contact with an image carrier, wherein an Asker C hardness of the elastic portion is not less than 20 and not more than 40, and a dynamic friction coefficient of a surface of the elastic portion is not less than 0.01 and not more than 0.2.

27 Claims, 4 Drawing Sheets

DEVELOPING AGENT CARRIER, DEVELOPING UNIT, AND IMAGE FORMING APPARATUS

BACKGROUND OF THE INVENTION

1. Field of the Invention

The present invention relates a developing agent carrier for carrying and conveying a developing agent used to develop an electrostatic latent image formed on an image carrier by using an electrophotographic scheme or electrostatic recording process, and a developing unit and image forming apparatus which include such developing agent carriers.

2. Related Background Art

In a conventional image forming apparatus, such as a copying machine or printer, the surface of a drum-like electrophotographic photosensitive member, i.e., a photosensitive drum, is uniformly charged, and an electrostatic latent image is formed on the surface by performing exposure in accordance with an image signal. This electrostatic latent image is developed into a toner image by a developing unit, and the toner image is transferred onto a recording medium. The image is then fixed to obtain a permanent image. As such an apparatus, an image forming apparatus having a developing unit for developing an electrostatic latent image on an image carrier by using an insulating, nonmagnetic, single-component toner is known.

FIG. 4 shows a developing device used in a conventional image forming apparatus.

A developing unit 4 has a developing agent vessel 15 open at a position to oppose a photosensitive drum 1. A developing roller 11 as a developing agent carrier is partly exposed outside the developing agent vessel and supported in the developing agent vessel 15 to be rotatable in the direction indicated by an arrow Y.

The developing agent vessel 15 contains a nonmagnetic single-component developing agent (to be simply referred to as toner hereinafter) as an insulating developing agent. An agitating member 13 agitates this toner and conveys it to an area where the developing roller 11 is in contact with a toner feed roller 12 as a means for feeding the toner to the developing roller 11.

The toner comes into contact with the developing roller 11 and is fed onto the developing roller 11 by the reflection force generated when the toner is fictionally charged in the slidable contact area between the developing roller 11 and the toner feed roller 12 that rotates in the direction indicated by an arrow Z, i.e., a direction opposite the rotational direction Y of the developing roller 11. The thickness of the toner fed onto the developing roller 11 by the toner feed roller 12 is controlled by a developing blade 14 as a means for controlling the thickness and charge amount of toner upon rotation of the developing roller 11 in the direction indicated by the arrow Y. This toner is applied to the surface of the developing roller 11 and carried/conveyed on the developing roller 11 to reach the developing area where the photosensitive drum 1 rotating in the direction indicated by an arrow X is in contact with the developing roller 11, i.e., a developing nip N.

A developing bias is applied from a power supply (not shown) to the developing roller 11. The toner is electrostatically attracted to the electrostatic latent image on the photosensitive drum 1 to form a toner image. The toner that does not contribute to the development of the electrostatic latent image and is left on the surface of the developing roller 11 reaches the developing agent vessel 15 upon rotation of the developing roller 11. This toner is scraped off from the surface of the developing roller 11 and recovered into the developing agent vessel 15.

The developing roller 11 that comes into contact with the rigid photosensitive drum 1 as an image carrier to perform development is preferably a roller having an body. In the deveoloping unit 4 including the developing roller 11 having an elastic member, a metal developing blade 14 is suitably used as the developing blade 14 to charge nonmagnetic single-component toner.

The above conventional image forming apparatus includes the developing unit using an insulating nonmagnetic single-component developing agent as a developing agent. The toner is fed from the toner feed roller 12 to the developing roller 11 by the reflection force generated when the toner is rub/charged in the slidable contact area between the toner feed roller 12 and the developing roller 11. Therefore, the toner itself is nonmagnetic, and hence this developing device is advantageous in forming a color image. In a developing unit using a magnetic single-component developing agent as a developing agent, as is known, a member that generate a magnetic field, i.e., a magnet, is disposed in the developing roller 11 to apply a magnetic force so as to feed and convey the toner. However, the arrangement of this image forming apparatus is basically the same as that of the above apparatus.

In the conventional image forming apparatus, which is designed to develop an electrostatic latent image on the photosensitive drum 1 by bringing the developing roller 11 having the elastic member into contact with the photosensitive drum 1, i.e., include a contact developing step, the surface of the developing roller 11 vibrates owing to the friction between the developing roller 11 and the photosensitive drum 1 in the developing nip N (developing area) where the developing roller 11 comes into contact with the photosensitive drum 1. As a result, in developing operation, the toner image on the photosensitive drum 1 is scattered in the developing nip N.

If the surface of the developing roller 11 is greatly distorted when the developing roller 11 comes into slidable contact with the photosensitive drum 1, the vibrations of the surface of the developing roller 11 are accelerated, and the developing roller 11 itself vibrates. As a result, the developing nip N varies in width. In the worst case, the developing roller 11 itself greatly vibrates, the developing roller 11 and photosensitive drum 1 are set in a noncontact state periodically. As a consequence, a non-development area periodically appears on the developing roller 11 in the developing unit to which a DC developing bias voltage is applied, resulting in pitch irregularity on the image formed a recording medium.

The following is the reason why a distorting force and vibration are generated on the surface of the developing roller 11 when the developing roller 11 comes into slidable contact with the photosensitive drum 1 in this manner. Conventionally, the developing roller 11 is an elastic roller having an elastic member including a solid layer made of silicone rubber, EPDM, or urethane rubber or sponge layer, and the dynamic friction coefficient of the surface of the developing roller 11 is generally set to about 0.2 to 1.5. As the coefficient of dynamic friction of the developing roller 11 increases, the frictional force between the developing roller 11 and the photosensitive drum 1 increases. As a result, the surface of the developing roller 11 vibrates. The vibration of the surface of the developing roller 11 becomes noticeable as the hardness of the developing roller 11 decreases. As a consequence, the toner is scattered on an output image on a recording medium.

Assume that a solid layer or sponge layer having a low hardness is used as an elastic layer, the dynamic friction coefficient of the developing roller 11 exceeds 0.2, and the hardness measured by an Asker C durometer is about 40 or less. In this case, in particular, the developing nip N between the developing roller 11 and the photosensitive drum 1 increases to increase the contact force on the surface of the developing roller 11 with respect to the surface of the photosensitive drum 1. As a result, the frictional force between the developing roller 11 and the photosensitive drum 1 increases. If, therefore, the dynamic friction coefficient of the surface of the developing roller 11 is large, the distortion of the surface of the developing roller 11 is large.

The "dynamic friction coefficient"used in this specification is defined as the value measured by the following device and method.

FIG. 5 shows the schematic arrangement of a device for measuring a dynamic friction coefficient. One end of a 0.03-mm thick thin stainless steel plate 24 is set on a digital force gauge 21, and a weight 22 is added to the other end portion of the steel plate 24. In addition, the developing roller 11 comes into contact with the middle of the stainless steel 24 such that an angle θ defined by the two ends of the stainless steel plate 24 becomes 45°. The digital force gauge 21 is adjusted to 0 in advance without the weight 22 and stainless steel 24.

After the digital force gauge 21 is stabilized, the developing roller 11 is rotated in the direction indicated by an arrow R. The frictional force between the developing roller 11 and the thin stainless steel plate 24 is measured by the digital force gauge 21 at this time. A measurement value is obtained as follows. The analog value output from the digital force gauge 21 is sampled by a recorder at a frequency of 10 Hz, and the sample data is calculated by a computer according to the following equation $$\mu=(1/\theta)\ln(F/W)$$

and, the calculation values corresponding to one revolution of the developing roller 11 are averaged.

In this case, the value of $\mu$ is the dynamic friction coefficient in this specification, W is the sum of a weight W1 of the weight 22 and a weight W2 of the thin stainless steel plate 24, and F is the measurement value obtained by the digital force gauge 21.

The dynamic friction coefficient of the surface of the developing roller 11 with respect to the thin stainless steel plate 24 is measured by the device for measuring the above dynamic friction coefficient for the following reason. In the conventional developing unit, a thin stainless steel plate having a thickness of about 0.1 mm is generally used as the developing blade 14. In addition, as the photosensitive drum 1, a member having a photosensitive layer having a thickness of about 10 $\mu$m formed on an aluminum plate or the like is used. For this reason, as the dynamic friction coefficient of the surface of the developing roller 11, the value obtained with respect to the thin stainless steel plate 24 is preferably used and compared. The resultant value seems to reflect the present situation.

The above problem, i.e., the problem that the distortion of the surface of the developing roller 11 becomes large as the dynamic friction coefficient of the surface of the developing roller 11 increases, can be suppressed by reducing a biting amount S of the developing roller 11 into the photosensitive drum 1, i.e., reducing the contact pressure between the developing roller 11 and the photosensitive drum 1. A reduction in contact pressure, however, increases the probability of contact failure between the developing roller 11 and the photosensitive drum 1. As a result, a development failure tends to occur.

Conventionally, therefore, the hardness of the developing roller 11 is increased to reduce the distortion of the surface of the developing roller 11 even if the dynamic friction coefficient of the surface of the developing roller 11 is large, thereby suppressing vibrations and preventing the toner from being scattered as in the above case. More specifically, the developing roller 11 having a solid layer with a hardness of 40 to 45 (JIS-A) (about 50 to 55 with an Asker C durometer) is generally used.

If, however, the hardness of the developing roller 11 increases, the contact pressure between the developing roller 11 and the photosensitive drum 1 increases As a result, the driving torque of the developing roller 11 increases. If this driving torque increases, the developing roller 11 rotates irregularly to cause developed state irregularity when a driving motor lacks torque. As a consequence, density irregularity occurs on an output image on a recording medium.

If the hardness of the conventional developing roller 11 having a large dynamic friction coefficient is increased to increase the contact pressure between the developing roller 11 and the photosensitive drum 1, the nonmagnetic single-component toner at the developing nip N is greatly damaged, resulting in a deterioration in toner. As a result, if the toner cannot be replaced alone, the service life of the developing unit or image forming apparatus becomes short. This phenomenon becomes noticeable especially when low-melting toner advantageous for low-temperature fixing is used.

Consider the roughness of the surface of the developing roller 11. In order to set the amount of toner applied to the developing roller 11 to a predetermined value, Rz (JIS 10-point average roughness) must be set to a predetermined value, and Rz is generally set to about 5 to 10 $\mu$m.

If, however, Rz is set to a large value, the number of times toner comes into contact with the surface of the developing roller 11 increases to enhance the charging performance. As a result, the toner coat amount on the developing roller 11 increases. In consideration of this phenomenon, an increase in Rz is not necessarily suitable for the developing roller 11 in terms of the above dynamic friction coefficient of the developing roller 11.

As described above, in the conventional image forming apparatus, in consideration of the formation of a toner coat on the developing roller 11, the dynamic friction coefficient of the surface of the developing roller 11 is large, and hence the frictional force at the developing nip N is large. Attempts to decrease the hardness of the developing roller under these circumstances in the prior art will increase the vibration of the surface of the developing roller 11 because of the large frictional force at the developing nip N. For this reason, in the prior art, the hardness of the developing roller 11 is increased to suppress this vibration. If, however, the hardness of the developing roller 11 is increased, the contact force at the developing nip N increases, and the driving torque of the developing roller 11 increases. In addition, the toner is greatly damaged, resulting in a deterioration in toner. As a consequence, low-melting toner, which allows low-temperature fixing and can be a useful material, cannot be properly used. Demands therefore have arisen for means for solving such a contradiction.

SUMMARY OF THE INVENTION

It is an object of the present invention to provide a developing agent carrier, developing unit, and image forming apparatus which can stably obtain a high-quality image.

In order to achieve the above object, according to the present invention, there is provided a developing agent carrier comprising an elastic portion which comes into contact with an image carrier, wherein an Asker C hardness of the elastic portion is not less than 20 and not more than 40, and a dynamic friction coefficient of a surface of the elastic portion is not less than 0.01 and not more than 0.2.

In addition, in order to achieve the above object, according to the present invention, there is provided a developing unit comprising a developing agent carrier for carrying a developing agent, the developing agent carrier including an elastic portion which comes into contact with the image carrier, wherein an Asker C hardness of the elastic portion is not less than 20 and not more than 40, and a dynamic friction coefficient of a surface of the elastic portion is not less than 0.01 and not more than 0.2.

Furthermore, in order to achieve the above object, according to the present invention, there is provided an image forming apparatus comprising an image carrier for carrying a latent image, and a developing agent carrier for carrying a developing agent, the developing agent carrier including an elastic portion which is in contact with the image carrier, wherein an Asker C hardness of the elastic portion is not less than 20 and not more than 40, and a dynamic friction coefficient of a surface of the elastic portion is not less than 0.01 and not more than 0.2.

It is another object of the present invention to provide a developing agent carrier, developing unit, and image forming apparatus, in which a developing agent carrier having a low hardness can be driven with a low torque in the image forming apparatus including a contact developing step using a single-component developing agent, the apparatus can be simplified and reduced in size, scattering of toner and pitch irregularity due to the deforming force of the surface of the developing agent carrier can be prevented while a high charging property for the toner is maintained, a deterioration in toner due to a high contact pressure at a developing nip N can be prevented, and a high-quality image can be stably obtained.

The above and other objects, features, and advantages of the present invention will be apparent from the following detailed description in conjunction with the accompanying drawings and the appended claims.

DETAILED DESCRIPTION OF THE PREFERRED EMBODIMENTS

A developing agent carrier, developing unit, and image forming apparatus according to an embodiment of the present invention will be described in detail below with reference to the accompanying drawings.

First Embodiment

Figure 1:
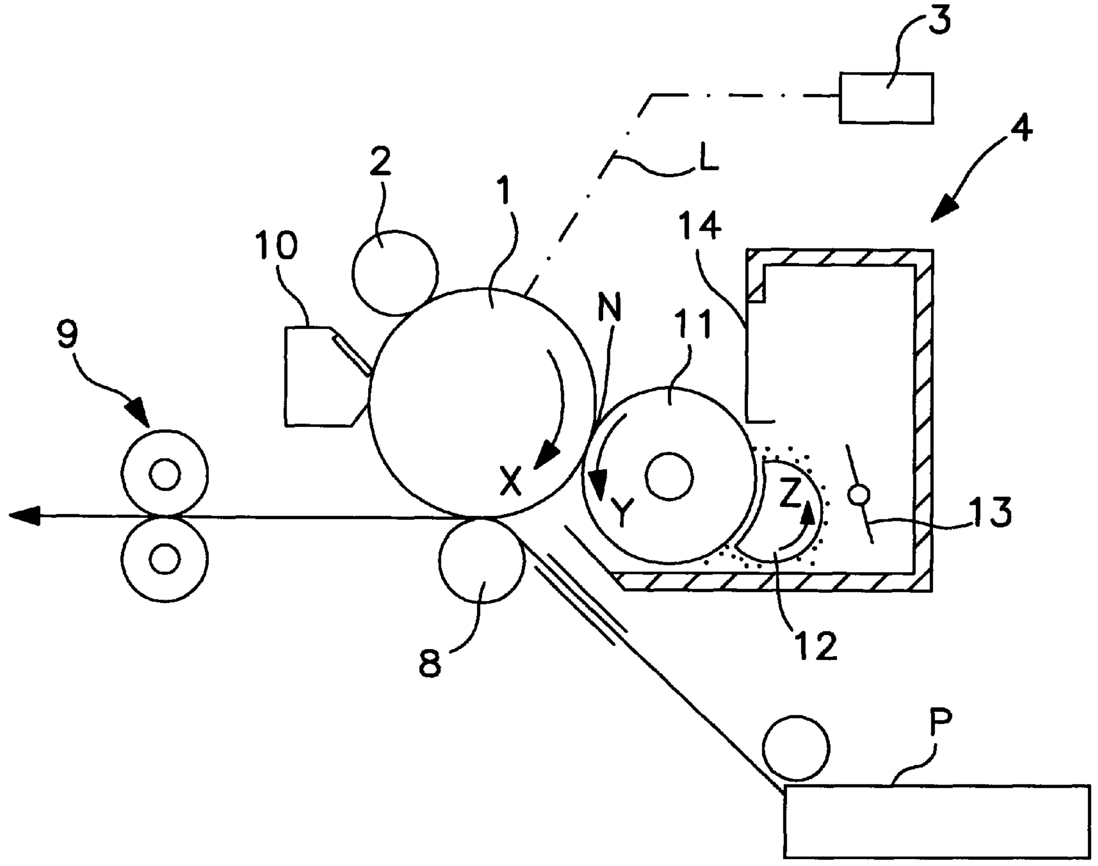
FIG. 1 is a schematic view showing the arrangement of an image forming apparatus according to an embodiment of the present invention.

FIG. 1 shows an image forming apparatus according to an embodiment of the present invention.

According to this embodiment, the image forming apparatus has a drum-like OPC electrophotographic photosensitive member, i.e., a photosensitive drum 1, which has an outer diameter of 30 mm and is supported to be rotatable in the direction indicated by an arrow X, as an image carrier. The photosensitive drum 1 is uniformly charged first by a charging roller 2 disposed along the outer surface of the photosensitive drum 1, and is then exposed with a laser beam L emitted by an exposure apparatus 3 in accordance with an image signal. As the photosensitive drum 1 rotates in the direction indicated by the arrow X, the electrostatic latent image formed on the photosensitive drum 1 by image exposure reaches a developing nip N (developing area) where a developing roller 11 as a developing agent carrier of a developing unit 4 comes into contact with the photosensitive drum 1, and makes electrostatic toner to be developed attach to obtain a toner image.

A transfer roller 8 then electrostatically transfers the toner image formed on the photosensitive drum 1 onto a recording medium P that is conveyed to the transfer roller 8 in synchronism with the formation of this toner image. The recording medium P carrying the unfixed toner image is conveyed to a fixing unit 9. The unfixed toner image is fixed as a permanent image by heat and pressure.

The recording medium is discharged from the image forming apparatus. A cleaning unit 10 having a blade-like cleaning means then removes residual toner and the like from the photosensitive drum 1 having undergone the transfer process, thus preparing for the next image forming operation.

In this embodiment, image output conditions in image evaluation (to be described in detail later) are set as follows. The charging potential of the photosensitive drum 1 is set to −650 V, the image area potential of an exposure area on the photosensitive drum 1 is set to −100 V, and the developing bias voltage applied to the developing roller 11 is set to a DC voltage of −350 V.

Figure 2:
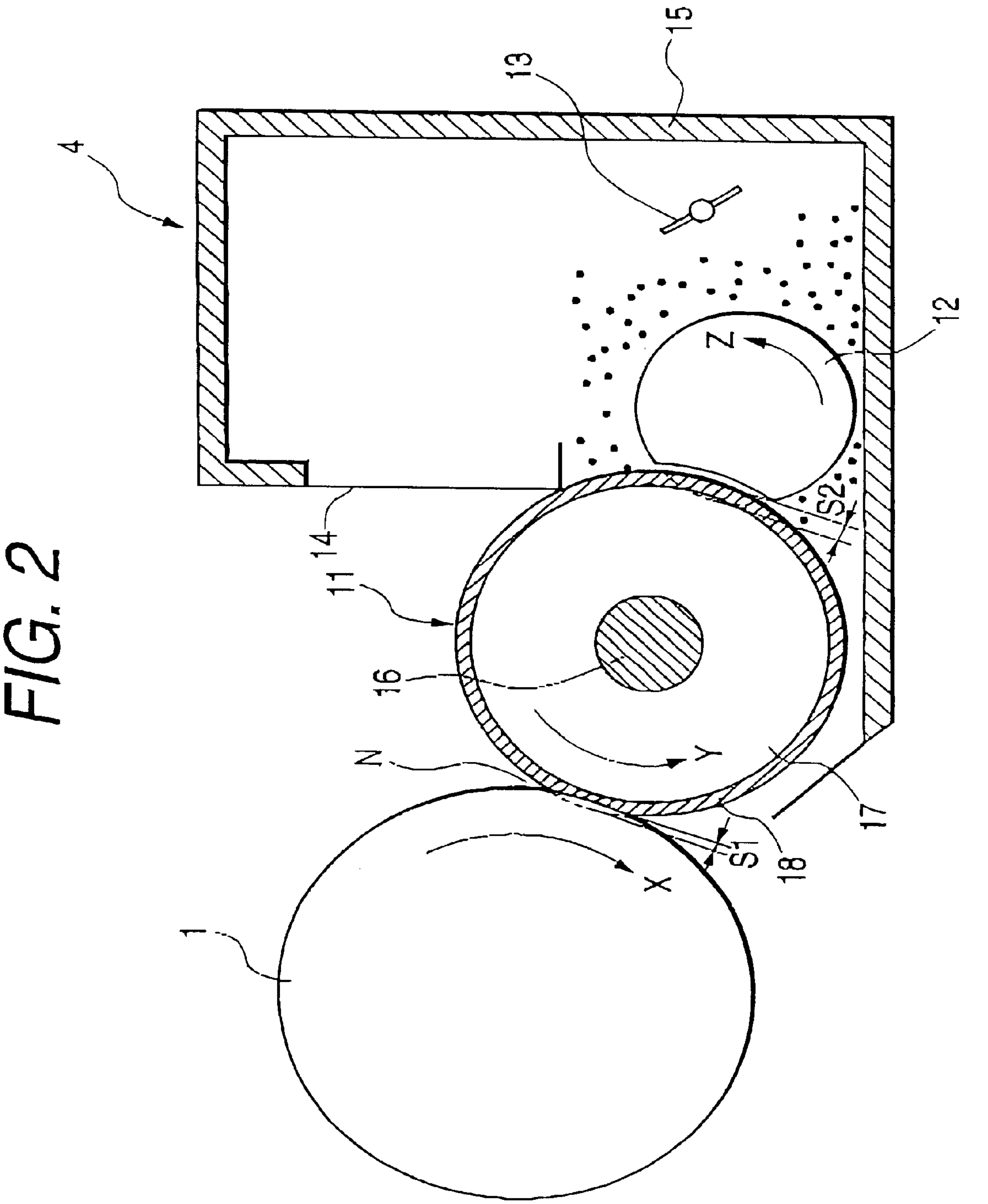
FIG. 2 is a schematic view showing a developing unit having a developing roller according to an embodiment of the present invention.

The developing unit 4 of the image forming apparatus according to this embodiment will be described in detail next with reference to FIG. 2

The developing unit 4 has a developing agent vessel 15 open at a position to oppose the photosensitive drum 1 The developing roller 11 as a developing agent carrier is partly exposed outside the developing agent vessel through the opening portion and supported in the developing agent vessel 15 to be rotatable in the direction indicated by an arrow Y. The developing roller 11 will be described in detail later. The outer diameter of the developing roller 11 is 16 mm, and a biting amount S1 of the developing roller 11 into the photosensitive drum 1 is set to about 250 μm by using a biting amount regulating roller (not shown).

In this embodiment, spherical, low-melting, nonmagnetic, single-component, polymeric toner is used, which is contained in the developing agent vessel 15. An agitating member 13 conveys this toner to a toner feed roller 12 as a means for feeding the toner to the developing roller 11. In this embodiment, the toner feed roller 12 is an insulating urethane sponge roller having an outer diameter of 16 mm and a hardness of about 10 (based on an Asker C durometer) and can rotate in the direction indicated by an arrow Z. The toner feed roller 12 comes into contact with the developing roller 11 with an biting amount S2 being kept to about 500 μm The toner conveyed by the toner feed roller 12 is fed onto the developing roller 11 by the reflection force generated when the toner is fictionally charged in the slidable contact area between the toner feed roller 12 and the developing roller 11.

The toner fed onto the developing roller 11 by the toner feed roller 12 is applied (coating) to the developing roller 11 with its thickness being controlled by a developing blade 14 as a means for controlling the thickness and charge amount of the toner upon rotation of the developing roller 11 in the direction indicated by an arrow Y. The toner is kept carried/conveyed on the developing roller 11 and reaches the developing area where the photosensitive drum 1 comes into contact with the developing roller 11, i.e., the developing nip N. Since a developing bias voltage has been applied from a power supply (not shown) to the developing roller 11, the toner is electrostatically attracted to the electrostatic latent image on the photosensitive drum 1, thereby forming a toner image. The toner that does not contribute to the development of the electrostatic latent image and is left on the surface of the developing roller 11 reaches the developing agent vessel 15 upon rotation of the developing roller 11 This toner is scraped off from the surface of the developing roller 11 by the toner feed roller 12 and recovered into the developing agent vessel 15.

Figure 3:
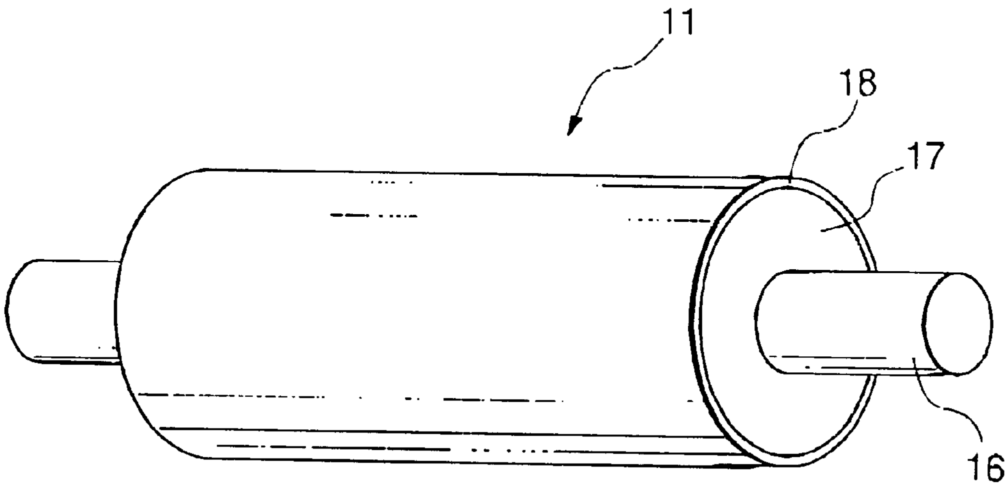
FIG. 3 is a perspective view of the developing roller according to the embodiment of the present invention.
Figure 4:
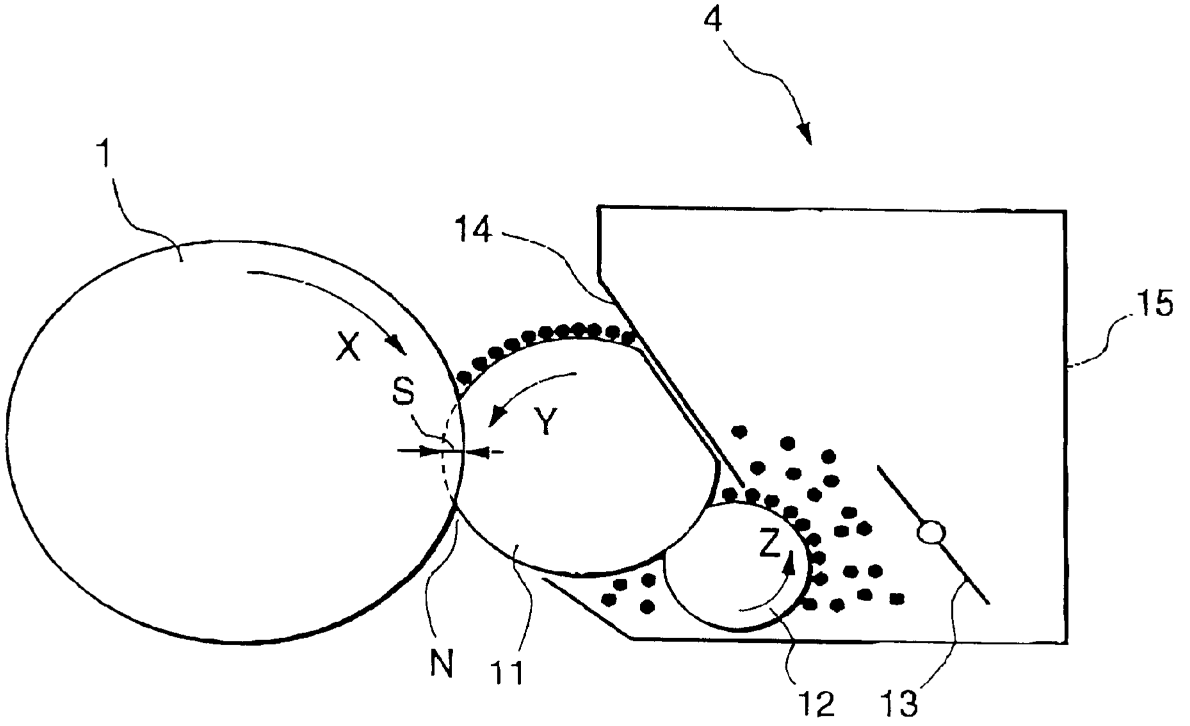
FIG. 4 is a schematic view showing a conventional developing unit.
Figure 5:
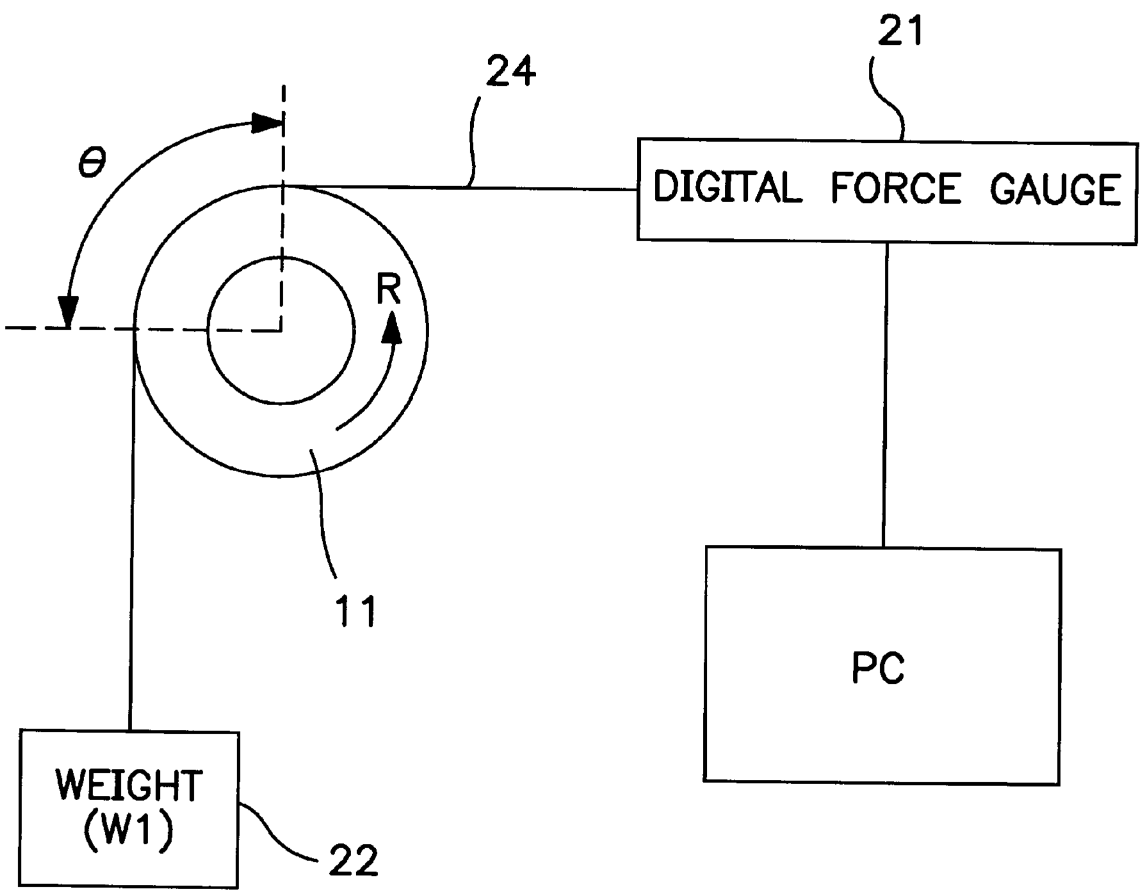
FIG. 5 is a schematic view for explaining a device for measuring a dynamic friction coefficient.

The developing roller 11 according to this embodiment will be described in detail below. FIG. 3 shows the developing roller.

According to this embodiment, the developing roller 11 is obtained by forming an elastic layer 17 having a thickness of about 5 mm, in which a conductive agent (conductive powder) such as carbon is dispersed, on a metal core 16 having an outer diameter of 6 mm. The surface of the developing roller 11A is coated with a conductive charging film (charging film) 18, which is a surface layer in which release particles with a particle size of about 5 to 15 μm and a conductive agent (conductive powder) such as carbon are dispersed, up to a thickness of about 10 to 20 μm by spray coating, dipping, or the like. The elastic layer 17 and surface 18 make up an elastic portion.

As the elastic layer 17, a silicone rubber layer such as an LTV layer, solid rubber layer such as an EPDM or urethane layer, or the like can be used. A silicone rubber layer such as an LTV layer is especially preferable as the elastic layer 17 in terms of low hardness and high durability.

As a material for the charging film 18, a material having positive charging polarity (negative charging property), e.g., polyamide resin, acrylic denatured silicone resin, acrylic urethane resin, acrylic-polyester-urethane resin, or a resin having at least one of them as a component, is used. Such a material is charged to a polarity opposite to that of the toner upon friction with the toner. The surface of the developing roller 11 is coated with this charging film to obtain a desired toner coat amount.

As release powder, fluorine-based fine powder, polyamide resin powder, silicone resin powder, a mixture containing at least one of these powders, or the like can be used. Release particles are used to decrease the dynamic friction coefficient of the surface of the developing roller 11.

The roughness of the surface of the developing roller 11 can be adjusted by adjusting Rz (JIS 10-point average roughness) and Rmax (JIS maximum height), which are adjusted by changing the particle size of release particles.

In the image forming apparatus including a contact developing step, the resistivity of the developing roller 11 may be set to about $10^2$ Ωcm to $10^8$ Ωcm to prevent leakage from the developing roller 11 to the photosensitive drum 1. In this embodiment, a predetermined amount of carbon as a conductive agent is dispersed in the elastic layer 17 and charging film 18 to set the resistivity of the developing roller 11 to $10^5$ Ωcm. Even if the electric resistance irregularity in the rotational direction of the developing roller 11 is in one order of magnitude, since the resistance of the developing roller 11 is considerably lower than that of the surface of the photosensitive drum 1 (in several orders of magnitudes), almost no influence is exerted on a developing electric field. Hence, no problem arises in terms of an output image. The present invention is not therefore limited to the resistivities in this embodiment.

Note that the elastic layer 17 may take a single-layer structure or a multilayer structure such as a two-layer structure. More specifically, the present invention properly functions either in a case wherein the charging film 18 is formed on the surface of a low-hardness solid layer as the elastic layer 17 having a single-layer structure or in a case wherein a conductive layer having a two-layer structure is formed by forming an LTV layer as an upper layer having a conductive agent dispersed therein on the surface of a lower layer which is a sponge layer including conductive foamed silicone or urethane foam having a conductive agent dispersed therein, and the charging film 18 is formed on the surface of the conductive layer of the two-layer structure. That is, the present invention properly functions as long as the developing roller 11 has a small dynamic friction coefficient and low hardness.

A detailed description of a method of manufacturing the developing roller according to the present invention, including a method of forming the charging film 18, a method of forming the elastic layer 17, and the like, will be omitted because the developing roller can be manufactured by a known manufacturing technique.

With the above arrangement, the developing roller 11 has a low hardness and small dynamic friction coefficient. This prevents a deterioration in toner, scattering of toner, and pitch irregularity. In addition, the developing roller 11 can be driven with a low torque.

In order to clarify the effects of the present invention, developing rollers a to f shown in Table 1, each of which has a dynamic friction coefficient, hardness (Asker C), and surface roughness (Rz and Rmax) adjusted by changing the materials of the elastic layer 17 and charging film 18 of the developing roller 11 and the particle size of release particles dispersed in the charging film 18, were prepared, together with developing rollers g to k shown Table 2, which were prepared as comparative examples. Each of these developing rollers was attached to the image forming apparatus in FIG. 1, and image forming operation was performed, thereby evaluating the image formed by using each developing roller.

In each of the developing rollers a to k, when a one-layer structure was used, the solid elastic layer 17 such as an LTV layer was formed by molding, and the sponge layer was formed by extrusion molding. When a two-layer structure was used, the sponge layer was formed by extrusion molding, and the surface layer was formed by molding. The charging film was formed by spray coating. However, the present invention is not limited to this manufacturing method, and can be manufactured by a known arbitrary manufacturing method.

TABLE 1

| Developing Roller | Elastic Layer | Charging Layer | Dynamic Friction Coefficient | Hardness (Asker C) | Rz | Rmax (μm) |
|---|---|---|---|---|---|---|
| a | LTV | fluorine particle dispersed polyamide | 0.1 | 40 | 7 | 10 |
| b | LTV | acrylic denatured silicone | 0.1 | 40 | 3 | 5 |
| c | LTV | fluorine particle dispersed polyamide | 0.1 | 40 | 5 | 8 |
| d | LTV | fluorine particle dispersed polyamide | 0.1 | 40 | 10 | 14 |
| e | LTV | fluorine particle dispersed polyamide | 0.1 | 40 | 13 | 16 |
| f | silicone sponge | carbon dispersed LTV + fluorine particle dispersed polyamide | 0.1 | 40 | 7 | 10 |

Of the developing rollers in Table 1 according to the present invention, the developing rollers a and f used fluorine particles with a particle size of about 8 μm, the developing roller c used fluorine particles with a particle size of about 6 μm, the developing roller d used fluorine particles with a particle size of about 12 μm, and the developing roller e used fluorine particles with a particle size of 15 μm. These developing rollers used these fluorine particles as release particles, and the surface roughnesses (Rz and Rmax) of the developing rollers were adjusted. In the developing roller b, acrylic denatured silicone was formed by spray coating without dispersing any release particles, and the surface roughness was adjusted by polishing the surface roughness of the elastic layer. Carbon (average primary particle size of about 20 to 100 nm) as a conductive agent (conductive powder) was dispersed in the elastic layers of the developing rollers a to f.

Although fluorine particles were used as the release particles used for the developing rollers in Table 1, the present invention is not limited to this. Similar effects can also be obtained by using polyamide powder, silicone resin powder, or a mixture containing at least one of these powders.

In addition, as the materials for the charging films 18 used for the respective developing rollers in Table 1, acrylic urethane resin, acrylic polyester urethane resin, and a resin containing at least one of these resins as a component, other than those shown in Table 1, can be used to obtain similar effects.

TABLE 2

| Developing Roller | Elastic Layer | Charging Layer | Dynamic Friction Coefficient | Hardness (Asker C) | Rz | Rmax (μm) |
|---|---|---|---|---|---|---|
| g | LTV | none | 1.2 | 60 | 7 | 10 |
| h | silicone sponge + LTV | none | 1.2 | 40 | 7 | 10 |
| i | EPDM | urethane | 0.7 | 60 | 7 | 10 |
| j | EPDM | acrylic denatured urethane | 0.2 | 60 | 7 | 10 |
| k | silicone | acrylic denatured | 0.2 | 40 | 7 | 10 |

TABLE 2-continued

| Developing Roller | Elastic Layer | Charging Layer | Dynamic Friction Coefficient | Hardness (Asker C) | Rz Rmax (μm) |
|---|---|---|---|---|---|
| | sponge | urethane + coat LTV | | | |

No release particles were dispersed in the surface layers of the developing rollers g to k as comparative examples shown in Table 2. As described above, carbon as conductive powder was dispersed in the elastic layers of the developing rollers g to k.

Table 3 shows the results obtained by mounting each developing roller in the developing unit of the image forming apparatus according to this embodiment shown in FIG. 1 and performing image forming operation under the above image output conditions.

TABLE 3

| Developing Roller | Coat Amount | Toner Charge Amount | Scattering of Toner | Deterioration in Toner | Image Irregularity |
|---|---|---|---|---|---|
| a | 0.3 | 40 | ○ | ○ | ○ |
| b | 0.3 | 50 | ○ | ○ | ○ |
| c | 0.3 | 40 | ○ | ○ | ○ |
| d | 0.35 | 40 | ○ | ○ | ○ |
| e | 0.35 | 40 | ○ | ○ | x |
| f | 0.35 | 40 | ○ | ○ | ○ |
| g | 0.15 | 20 | ○ | x | ○ |
| h | 0.15 | 20 | x | x | ○ |
| i | 0.3 | 25 | ○ | x | ○ |
| j | 0.3 | 25 | ○–Δ | x | ○ |
| k | 0.3 | 25 | ○–Δ | ○ | ○ |

The following are findings from the results in Table 3.

(1) If the dynamic friction coefficient of the surface of a developing roller is 0.2 or less, properties associated with toner scattering on an image, toner deterioration, and image irregularity are good on the whole regardless of the hardness of the developing roller. Although image irregularity occurs in the developing roller e according to the present invention, this will be described later.

(2) When the dynamic friction coefficient of the surface of a developing roller is 0.7 or more, and the hardness of the developing roller is high (60 or more according to an Asker C durometer), toner does not scatter on an image, but deteriorates.

(3) When the dynamic friction coefficient of the surface of a developing roller is 1.2, and the hardness of the developing roller is low (40 according to the Asker C durometer), toner scatters on an image and deteriorates.

(4) When Rmax is 15 μm or less, no image irregularity occurs.

This embodiment will be described in more detail below.

First of all, according to the present invention, fluorine-based powder, polyamide powder, silicone resin powder, or a mixture containing at least one of them, as release powder, is dispersed in the surface layer of the developing roller 11 to set the dynamic friction coefficient of the developing roller 11 to a predetermined value (0.2) or less, thereby preventing toner scattering in development or pitch irregularity.

Note that since a reflection force as the attraction that make toner attract to the developing roller 11 is generated between the surface of the developing roller 11 and the toner by the charge amount obtained by the frictional force between the toner feed roller 12 and the toner, there is no possibility that the surface of the developing roller 11 has no dynamic friction coefficient (i.e., 0). This is because frictional charging cannot be caused between the surface of the developing roller 11 and the toner. Owing to the necessity of frictional charging between the surface of the developing roller 11 and the toner, the dynamic friction coefficient is set to 0.01 or more according to the study made by the present inventors. The dynamic friction coefficient is preferably set to 0.01 or more and 0.2 or less. In order to make toner obtain a sufficient frictional charge amount, the dynamic friction coefficient is more preferably set to 0.1 or more and 0.2 or less.

In the prior art, in order to set the amount of toner applied to the developing roller 11 to a predetermined value, the surface roughness (Rz) of the developing roller 11 needs to be set to a predetermined value. According to the study in this embodiment, the amount of toner applied to the developing roller 11 is not necessarily associated with the surface roughness (Rz) of the developing roller 11, but is rather associated with the material of the charging film 18 formed on the surface of the developing roller 11. More specifically, if a material having a high charging property, e.g., polyamide resin, acrylic denatured silicone resin, acrylic-urethane resin, acrylic-polyester-urethane resin, or a resin containing at least one of them as a component, is used for the charging film 18 according to the present invention, an almost stable toner coat amount can be obtained regardless of the surface roughness (Rz) of the developing roller 11 which varies depending on the presence/absence of release particles dispersed in the charging film to reduce the dynamic friction coefficient of the surface layer of the developing roller 11 or the particle size.

This can be understood from the fact that in the developing roller 11 having a low dynamic friction coefficient, the force that allows the surface of the developing roller 11 to carry toner is generated by the reflection force based on frictional charging that occurs when the agitating member 13 feeds the toner to the developing roller 11.

When the surface roughness (Rz) of the developing roller 11 increases, the frequency of contact between toner and the surface of the developing roller 11 increases to enhance the charging property. This may increase the toner coat amount. This phenomenon occurs when a material whose charging property for toner is considerably lower than that of polyamide resin or the like, such as general urethane resin, is used for the surface of the developing roller 11 (e.g., the developing rollers g and h using no charging film) or release particles are embedded in the charging resin film and the particle surfaces do not appear from the film. When the surface of the developing roller 11 is formed by using a material, e.g., polyamide resin, which has a high charging property for negative toner, the coat amount can be adjusted in accordance with only the conditions set for the developing blade 14 regardless of the surface roughness (Rz) of the developing roller 11.

As is obvious from the developing roller e as a comparative example, when Rmax (JIS maximum height) as a surface roughness of the developing roller 11 exceeds 15 μm, image irregularity on an output image tends to worsen regardless of the toner coat amount on the developing roller 11. Rmax as a surface roughness of the developing roller 11 is therefore preferably set to 15 μm or less.

If, however, Rmax of the surface of the developing roller 11 is small, i.e., the surface of the developing roller 11 approaches a mirror surface, the presence of a foreign substance between the developing blade 14 and the developing roller 11 generally tends to produce coat stripes in the circumferential direction of the surface of the developing roller 11. To prevent such coat streaks, therefore, the surface roughness Rmax is set to 1 μm or more, and more preferably to 1 μm or more and 15 μm or less. To suppress coat stripes and ensure a large margin for image irregularity, Rmax is more preferably set to 5 μm or more and 15 μm or less.

In the prior art, as disclosed in Japanese Laid-Open Patent Application No. 5-072883, since the surface of the developing roller 11 wears out from friction with toner, and the surface roughness (Rz) of the developing roller 11 changes over time, the toner coat amount on the surface of the photosensitive drum 1 changes over time, i.e., the stability of the toner coat amount deteriorates over time. If, however, the developing roller 11 whose dynamic friction coefficient is set to a predetermined value or less by dispersing release particles in the charging film 18 such as a polyamide resin film according to the present invention, since there is not correlation between the surface roughness of the developing roller 11*a* and the toner coat amount, the state of the surface of the developing roller 11 does not change owing to friction between the toner and the developing roller 11, or the toner coat amount does not change. That is, the stability of the toner coat amount on the surface of the developing roller 11 improves over time If the developing roller 11 having a high dynamic friction coefficient (e.g., about 0.7 to 1.2 according to the above measurement method) is used as in the prior art, toner deteriorates owing to friction between the developing roller 11 and the photosensitive drum 1 in the slidable contact area (developing nip N). In addition, the toner, which has deteriorated, tends to contaminate the developing roller 11 and the developing blade 14 to degrade the charging property for the toner, resulting in a reduction in the toner coat amount on the surface of the developing roller 11. Such a tendency is noticeable.

In the use of the developing roller 11 having a low dynamic friction coefficient according to the present invention, since there is a correlation between the hardness of the developing roller and a deterioration in toner, a deterioration in toner due to friction at the developing nip N can be prevented by reducing the dynamic friction coefficient of the developing roller 11 and decreasing the hardness for the following reason. The contact pressure between the photosensitive drum 1 and the generally used conventional developing roller 11 having a high dynamic friction coefficient and a JIS-A hardness of 40 to 50 (about 50 to 60 according to an Asker C durometer) is about 100 g/cm in linear pressure when the biting amount S is set to about 250 μm. In contrast to this, the contact pressure between the photosensitive drum 1 and the developing roller 11 having a low dynamic friction coefficient according to the present invention is about 30 g/cm in linear pressure, which is about ⅓ that in the prior art, when the hardness of the developing roller 11 is set to be low (about 30 or less in JIS-A hardness; 40 or less according to the Asker C durometer) According to the present invention, therefore, the frictional force between the developing roller 11 and the photosensitive drum 1 is reduced by forming a charging film in which release particles are dispersed. In addition, a deterioration in toner due to friction between the developing roller 11 and the photosensitive drum 1 can be prevented by making the developing roller 11 have a low hardness of 40 or less according to the Asker C durometer.

In general, however, a reduction in hardness will worsen the compression set (JIS K 6301). In addition, with a reduction in hardness, oil or the like bleeds from a rubber material. For this reason, in the current situation, the hardness of the developing roller 11 is set to about 20 or more according to the Asker C durometer. If, however, the above problem is neglected, a developing roller having a hardness of about 7 according to the Asker C durometer can be manufactured. In the present invention, therefore, the feasible hardness range is set from about 7 or more to 40 or less, and more preferably from 20 or more to 40 or less.

According to the present invention, therefore, the developing roller can be driven with a low torque by forming a charging film on the surface of the developing roller as a developing agent carrier, dispersing release particles in the charging film, and decreasing the hardness of the developing roller. In addition, scattering of toner and pitch irregularity due to the distorting force of the surface of the developing roller can be prevented while the high charging property for toner is maintained. In addition, a deterioration in toner due to a high contact pressure at the developing nip N can be prevented.

This embodiment has exemplified the developing unit using nonmagnetic single-component toner as a developing agent and the image forming apparatus using this developing unit. However, the present invention is not limited to them. It should be noted that the present invention can be applied to a developing unit having a developing roller that can carry magnetic single-component toner as a developing agent by using a magnetic force and an image forming apparatus using the developing unit.

In consideration of the fact that the present invention is effective in preventing a deterioration in toner, the present invention can be effectively applied to a so-called cleaner-less image forming apparatus, from which the cleaning unit 10 in FIG. 1 is omitted, for the following reason. In general, according to the cleaner-less scheme, toner that has deteriorated is poor in transfer efficiency, and such toner left as residual toner on the surface of the photosensitive drum 1 after transfer operation returns to the developing unit 4 and stored therein. With an increase in the amount of residual toner, development properties (e.g., fogging and density) greatly deteriorate As the developing agent carrier, the roller-like developing roller has been described. However, the present invention is not limited to the shape of this developing agent carrier. For example, the developing agent carrier may take a belt-like shape.

What is claimed is:

1. A developing agent carrier for carrying a developing agent comprising an elastic portion which comes into contact with an image carrier, wherein an Asker C hardness of said elastic portion is not less than 20 and not more than 40, and a dynamic friction coefficient of a surface of said elastic portion against stainless steel is not less than 0.01 and not more than 0.2.

2. A carrier according to claim 1, wherein a surface roughness Rmax (JIS maximum height) of said elastic portion is not less than 1 $\mu$m and not more than 15 $\mu$m.

3. A carrier according to claim 1, wherein said elastic portion includes an elastic layer and a surface layer formed on a surface of the elastic layer.

4. A carrier according to claim 3, wherein the surface layer contains a charging material which is charged to a polarity opposite to that of a developing agent by friction with the developing agent.

5. A carrier according to claim 4, wherein the material is a resin selected from the group consisting of polyamide resin, acrylic denatured silicone resin, acrylic-urethane resin, acrylic-polyester-urethane resin, and a resin containing at least one of the resins.

6. A carrier according to claim 3, wherein the surface layer contains a dynamic friction coefficient decreasing material for decreasing the dynamic friction coefficient of the surface of said elastic portion.

7. A carrier according to claim 6, wherein the dynamic friction coefficient decreasing material is a material selected from the group consisting of fluorine-based powder, polyamide powder, silicone resin powder, and a mixture containing at least one of the powders.

8. A carrier according to claim 1, wherein the surface layer contains a charging material which is charged to a polarity opposite to that of a developing agent by friction with the developing agent, and a dynamic friction coefficient decreasing material for decreasing the dynamic friction coefficient of the surface of said elastic portion.

9. A carrier according to claim 3, wherein the elastic layer is made of a material selected from the group consisting of silicone rubber, EPDM, and urethane rubber.

10. A carrier according to claim 8, wherein a resistivity of the elastic layer is not less than $10^2$ Ωcm and not more than $10^8$ Ωcm.

11. A carrier according to claim 1, wherein the image carrier has a roller- or belt-like shape.

12. A carrier according to claim 1, wherein the developing agent is a nonmagnetic single-component developing agent.

13. A developing agent carrier for carrying a developing agent comprising an elastic portion which comes into contact with an image carrier, said elastic portion including an elastic layer and a surface layer formed on a surface of the elastic layer, the surface layer containing a charging material which is charged to a polarity opposite to that of a developing agent by friction with the developing agent, and a dynamic friction coefficient decreasing material for decreasing the dynamic friction coefficient of the surface of said elastic portion, wherein an Asker C hardness of said elastic portion is not less than 20 and not more than 40, a dynamic friction coefficient of a surface of said elastic portion against stainless steel is not less than 0.01 and not more than 0.2, a surface roughness Rmax (JIS maximum height) of said elastic portion is not less than 1 $\mu$m and not more than 15 $\mu$m, and a resistivity of the elastic layer is not less than $10^2$ Ωcm and not more than $10^8$ Ωcm.

14. A developing unit comprising a developing agent carrier for carrying a developing agent, said developing agent carrier including an elastic portion which comes into contact with said image carrier, wherein an Asker C hardness of said elastic portion is not less than 20 and not more than 40, and a dynamic friction coefficient of a surface of said elastic portion against stainless steel is not less than 0.01 and not more than 0.2.

15. A unit according to claim 14, wherein a surface roughness Rmax (JIS maximum height) of said elastic portion is not less than 1 $\mu$m and not more than 15 $\mu$m.

16. A unit according to claim 14, wherein said elastic portion includes an elastic layer and a surface layer formed on a surface of the elastic layer.

17. A unit according to claim 16, wherein the surface layer contains a charging material which is charged to a polarity opposite to that of a developing agent by friction with the developing agent.

18. A unit according to claim 17, wherein the material is a resin selected from the group consisting of polyamide resin, acrylic denatured silicone resin, acrylic-urethane resin, acrylic-polyester-urethane resin, and a resin containing at least one of the resins.

19. A unit according to claim 16, wherein the surface layer contains a dynamic friction coefficient decreasing material for decreasing the dynamic friction coefficient of the surface of said elastic portion.

20. A unit according to claim 19, wherein the dynamic friction coefficient decreasing material is a material selected from the group consisting of fluorine-based powder, polyamide powder, silicone resin powder, and a mixture containing at least one of the powders.

21. A unit according to claim 16, wherein the elastic layer is made of a material selected from the group consisting of silicone rubber, EPDM, and urethane rubber.

22. A unit according to claim 14, wherein the surface layer contains a charging material which is charged to a polarity opposite to that of a developing agent by friction with the developing agent, and a dynamic friction coefficient decreasing material for decreasing the dynamic friction coefficient of the surface of said elastic portion.

23. A unit according to claim 22, wherein a resistivity of the elastic layer is not less than $10^2$ Ωcm and not more than $10^8$ Ωcm.

24. A unit according to claim 14, wherein the image carrier has a roller- or belt-like shape.

25. A unit according to claim 14, wherein the developing agent is a nonmagnetic single-component developing agent.

26. A developing unit comprising a developing agent carrier for carrying a developing agent, said developing agent carrier including an elastic portion which comes into contact with an image carrier, said elastic portion including an elastic layer and a surface layer formed on a surface of the elastic layer, the surface layer containing a charging material which is charged to a polarity opposite to that of a developing agent by friction with the developing agent, and a dynamic friction coefficient decreasing material for decreasing the dynamic friction coefficient of the surface of said elastic portion, wherein an Asker C hardness of said elastic portion is not less than 20 and not more than 40, a dynamic friction coefficient of a surface of said elastic portion against stainless steel is not less than 0.01 and not more than 0.2, a surface roughness Rmax (JIS maximum height) of said elastic portion is not less than 1 μm and not more than 15 μm, and a resistivity of the elastic layer is not less than $10^2$ Ωcm and not more than $10^8$ Ωcm.

27. An image forming apparatus comprising:

an image carrier for carrying a latent image; and a developing agent carrier for carrying a developing agent, said developing agent carrier including an elastic portion which is in contact with said image carrier, wherein an Asker C hardness of said elastic portion is not less than 20 and not more than 40 and a dynamic friction coefficient of a surface of said elastic portion against stainless steel is not less than 0.01 and not more than 0.2.

* * * * *

UNITED STATES PATENT AND TRADEMARK OFFICE
CERTIFICATE OF CORRECTION

PATENT NO. : 6,376,087 B1
DATED : April 23, 2002
INVENTOR(S) : Yukihiro Ozeki et al.

It is certified that error appears in the above-identified patent and that said Letters Patent is hereby corrected as shown below:

Column 2,
Line 11, "an" should read -- an elastic --;
Line 12, "deveoloping" should read -- developing --;
Line 29, "generate" should read -- generates --; and
Line 39, "include" should read -- including --.

Column 4,
Line 35, "increases" should read -- increases. --;
Line 54, "Consider the" should read -- Now, the --; and
Line 55, "roller 11." should read -- roller 11 will be cosidered. --.

Column 6,
Line 52, "attach" should be deleted.

Column 7,
Line 12, "open" should read -- opened -- and "drum 1" should read -- drum 1. --;
Line 34, "an" should read -- a --;
Line 35, "µm" should read -- µm. --; and
Line 58, "roller 11" should read -- roller 11. --.

Column 11,
Line 66, "make" should read -- makes --.

Column 13,
Line 63, "not" should read -- no --.

Column 14,
Line 4, "time" should read -- time. --; and
Line 38, "durometer)" should read -- durometer). --.

UNITED STATES PATENT AND TRADEMARK OFFICE
CERTIFICATE OF CORRECTION

PATENT NO. : 6,376,087 B1
DATED : April 23, 2002
INVENTOR(S) : Yukihiro Ozeki et al.

It is certified that error appears in the above-identified patent and that said Letters Patent is hereby corrected as shown below:

Column 15,
Line 26, "deteriorate" should read -- deteriorate. --.

Column 16,
Line 20, "including" should read -- including: --; and
Line 21, "layer" should read -- layer; --.

Column 17,
Line 27, "including" should read -- including: --; and
Line 28, "layer" should read -- layer; --.

Signed and Sealed this

First Day of October, 2002

*Attest:*

JAMES E. ROGAN

*Attesting Officer*

*Director of the United States Patent and Trademark Office*